(12) United States Patent
Chu

(10) Patent No.: US 8,979,055 B2
(45) Date of Patent: Mar. 17, 2015

(54) TRIPOD HEAD

(71) Applicant: Hon Hai Precision Industry Co., Ltd., New Taipei (TW)

(72) Inventor: Chih-Hao Chu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/932,210

(22) Filed: Jul. 1, 2013

(65) Prior Publication Data

US 2014/0166831 A1    Jun. 19, 2014

(30) Foreign Application Priority Data

Dec. 17, 2012    (TW) .............................. 101147759 A

(51) Int. Cl.
*A47F 5/00* (2006.01)
*F16M 11/14* (2006.01)

(52) U.S. Cl.
CPC ......... *F16M 11/14* (2013.01); *F16M 2200/022* (2013.01)
USPC .............. 248/288.31; 248/288.51; 248/177.1; 248/178.1; 248/181.1; 248/278.1; 248/514

(58) Field of Classification Search
USPC .......... 248/205.1, 278.1, 177.1, 178.1, 181.1, 248/288.31, 288.51, 514, 515, 516; 403/115, 122, 143
See application file for complete search history.

(56) References Cited

U.S. PATENT DOCUMENTS

| | | | | |
|---|---|---|---|---|
| 2,739,780 | A * | 3/1956 | Richards | 248/324 |
| 5,899,167 | A * | 5/1999 | Furman | 116/173 |
| 6,328,270 | B1 * | 12/2001 | Elberbaum | 248/288.31 |
| 7,100,881 | B2 * | 9/2006 | Worrall | 248/278.1 |
| 7,278,620 | B2 * | 10/2007 | Blateri | 248/343 |
| 7,591,446 | B2 * | 9/2009 | Istas et al. | 248/288.11 |
| 2002/0000503 | A1 * | 1/2002 | Fidler | 248/288.51 |

* cited by examiner

*Primary Examiner* — Todd M Epps
(74) *Attorney, Agent, or Firm* — Novak Druce Connolly Bove + Quigg LLP

(57) ABSTRACT

A tripod head includes a shell, an adjusting member, a supporting member, and a locking member. The shell defines a receiving space and an adjusting opening communicating with the receiving space. The adjusting member includes a spherical adjusting portion and a connecting portion connected to the adjusting portion. The adjusting portion is received in the receiving space, and the connecting portion passes out of the shell through the adjusting opening. The adjusting portion adjusts a position and angle of the connecting portion relative to the shell by rotating in the receiving space. The supporting member supports the adjusting portion in the receiving space. The locking member locks the adjusting portion between the supporting member and the shell.

20 Claims, 4 Drawing Sheets

TRIPOD HEAD

BACKGROUND

1. Technical Field

The present disclosure relates to cameras, and particularly to a low cost tripod head for supporting cameras.

2. Description of Related Art

Tripods are used for supporting cameras to allow steady shooting of the cameras and include a tripod head, which allows a user to adjust a shoot angle of the camera. At present, the tripod head generally has a complicated adjusting structure, increasing cost of the tripod head.

What is needed therefore is a tripod head addressing the limitations described.

BRIEF DESCRIPTION OF THE DRAWINGS

The components of the drawings are not necessarily drawn to scale, the emphasis instead being placed upon clearly illustrating the principles of the embodiments of the present disclosure. Moreover, in the drawings, like reference numerals designate corresponding parts throughout several views.

DETAILED DESCRIPTION

Figure 1:
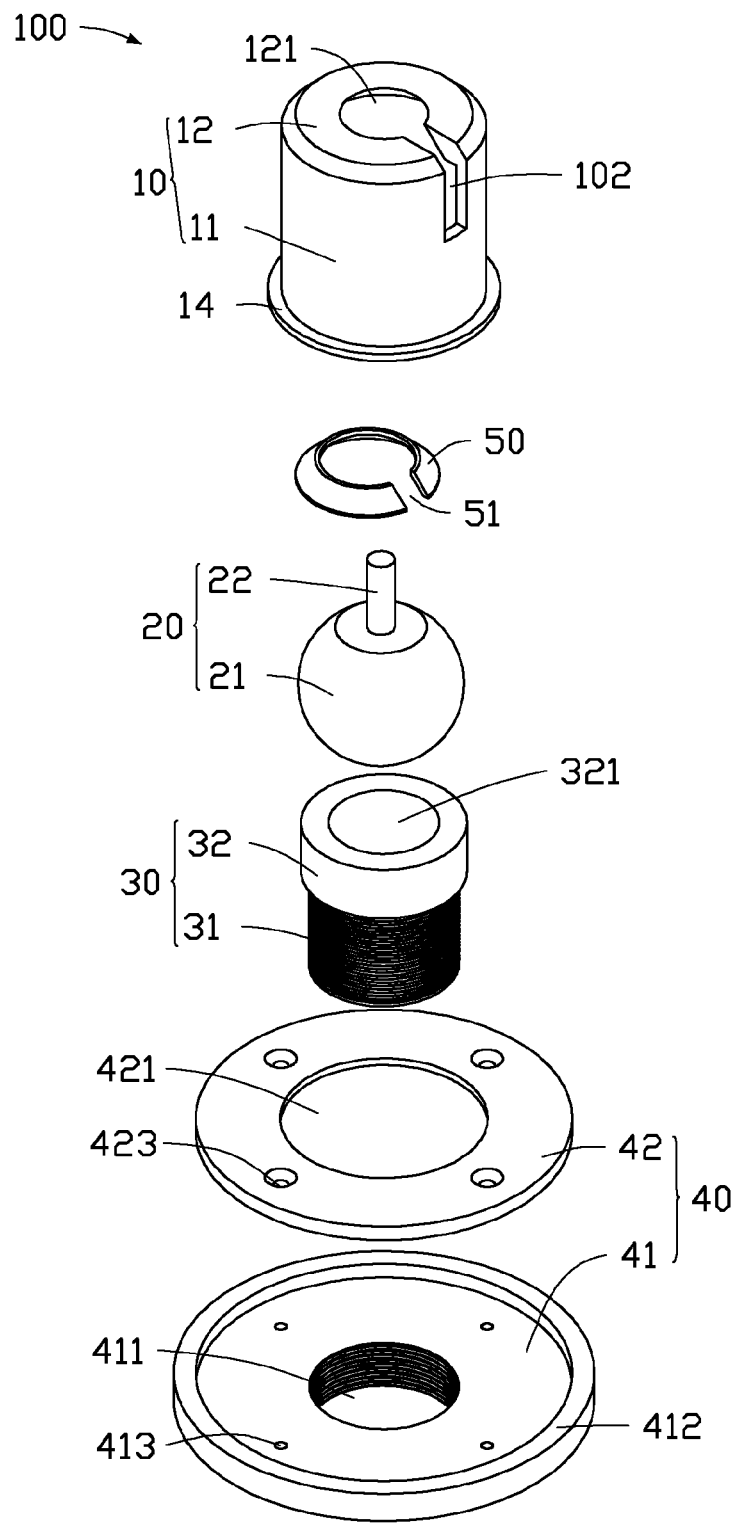
FIG. 1 is an exploded view of a tripod head according to an exemplary embodiment of the present disclosure.
Figure 2:
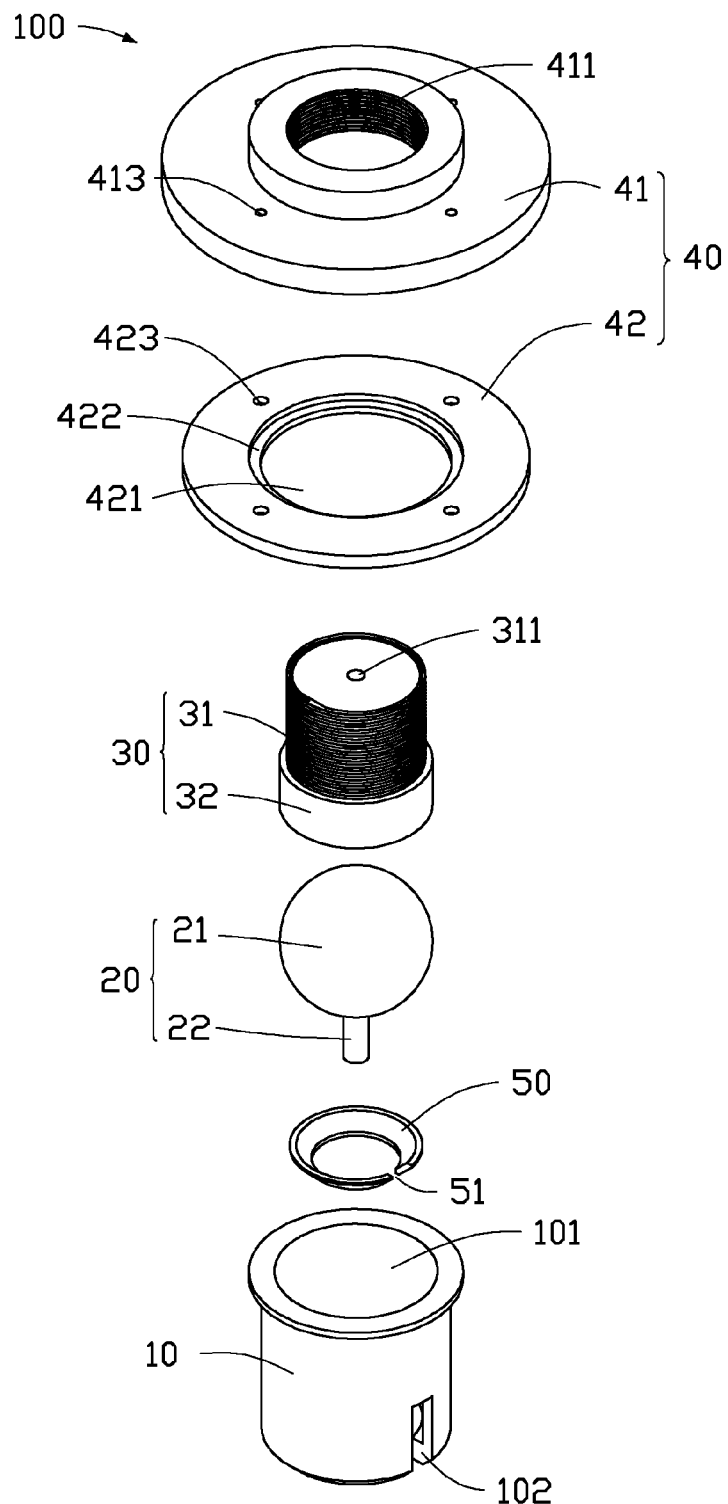
FIG. 2 is similar to FIG. 1, but showing the tripod head from another angle.

FIGS. 1-2 show a tripod head 100 according to an exemplary embodiment. The tripod head 100 includes a shell 10, an adjusting member 20, a supporting member 30, and a locking member 40.

The shell 10 is substantially a hollow cylinder. The shell 10 includes a sidewall 11 and an upper plate 12 connected to an end of the sidewall 11. The sidewall 11 and the upper plate 12 cooperatively define a receiving space 101. The sidewall 11 includes a substantially ring-shaped flange portion 14 protruding from an end away from the upper plate 12. In this embodiment, the flange portion 14 is a continuous ring. Alternatively, the flange portion 14 can be comprised of a number of protruding blocks annularly arranged and spaced from each other. The upper plate 12 defines a first adjusting opening 121 communicating with the receiving space 101. The first adjusting opening 121 is substantially round.

The shell 10 further defines a second adjusting opening 102 communicating with the first adjusting opening 121. The second adjusting opening 102 extends from the first adjusting opening 121 perpendicularly away from the upper plate 12 into the sidewall 11. In another embodiment, the second adjusting opening 102 helically extends away from the upper plate 12.

The adjusting member 20 includes an adjusting portion 21 and a connecting portion 22 connected to the adjusting portion 21. The adjusting portion 21 adjusts a position and angle of the connecting portion 22 relative to the shell 10. The adjusting portion 21 is substantially spherical. An end of the connecting portion 22 is fixedly connected to the adjusting portion 21. The end of the connecting portion 22 away from the adjusting portion 21 connects to a camera (not shown) by a suitable connection means.

The supporting member 30 includes a threaded portion 31 and a supporting portion 32 connected to the threaded portion 31. The threaded portion 31 is substantially cylindrical. The threaded portion 31 defines a connecting hole 311 defined in an end away from the supporting portion 32. The connecting hole 311 connects to a tripod (not shown). The connecting hole 311 is an internally threaded hole. The supporting portion 32 is fixedly connected to an end of the threaded portion 31. The supporting portion 32 includes a supporting surface 321 away from the threaded portion 31. The supporting surface 321 is concave and is conformed to the shape of the adjusting portion 21.

The locking member 40 locks the adjusting member 20 in the shell 10. The locking member 40 includes a first plate 41 and a second plate 42. The first plate 41 defines a threaded hole 411 in its center. The threaded hole 411 receives the threaded portion 31 of the supporting member 30 so as to firmly connect the supporting member 30 to the locking member 40. A thickness of the central portion of the first plate 41 is larger that of a peripheral portion of the first plate 41 surrounding the central portion, thus to elongate an axial length of the threaded hole 411. Therefore, a steady connection between the supporting member 30 and the locking member 40 can be ensured. The first plate 41 is substantially circular. Alternatively, the first plate 41 can be polygonal-shaped, such as a rectangular, triangular, or the like. The first plate 41 includes a protrusion portion 412 around its periphery. The protrusion portion 412 protrudes along a direction substantially parallel to a central axis of the threaded hole 411. The protrusion portion 412 is a continuous ring around the periphery of the first plate 41. Alternatively, the protrusion portion 412 can be comprised of a number of protrusions spaced apart. The first plate 41 defines a number of first connecting holes 413 around the threaded hole 411. The first connecting holes 413 are threaded holes.

The second plate 42 defines a substantially circular through hole 421 in its center. The size of the through hole 421 allows the shell 10, but not the flange portion 14, to pass through. In this embodiment, the through hole 421 is substantially circular-shaped, and a diameter of the through hole 421 is larger than an outer diameter of the sidewall 11 and less than an outer diameter of the flange portion 14. The second plate 42 defines a recess portion 422 surrounding the through hole 421. A size and shape of the recess portion 422 accommodate a size and shape of the flange portion 14. A shape of the second plate 42 accommodates a shape of an inner side surface of the protrusion portion 412. The second plate 42 defines a number of second connecting holes 423 corresponding to the first connecting holes 413.

The first plate 41 and the second plate 42 are fixedly connected to each other by fixing members (not shown), such as bolts or rivets. In this embodiment, the fixing members are bolts. The fixing members pass through the second connecting holes 423 into the corresponding first connecting holes 413.

The tripod head 100 further includes a pad 50. The pad 50 is substantially ring-shaped, and the pad 50 has a truncated conical outer side surface. The pad 50 defines an opening 51 corresponding to the second adjusting opening 102. In this embodiment, the pad 50 is made of rubber.

Figure 3:
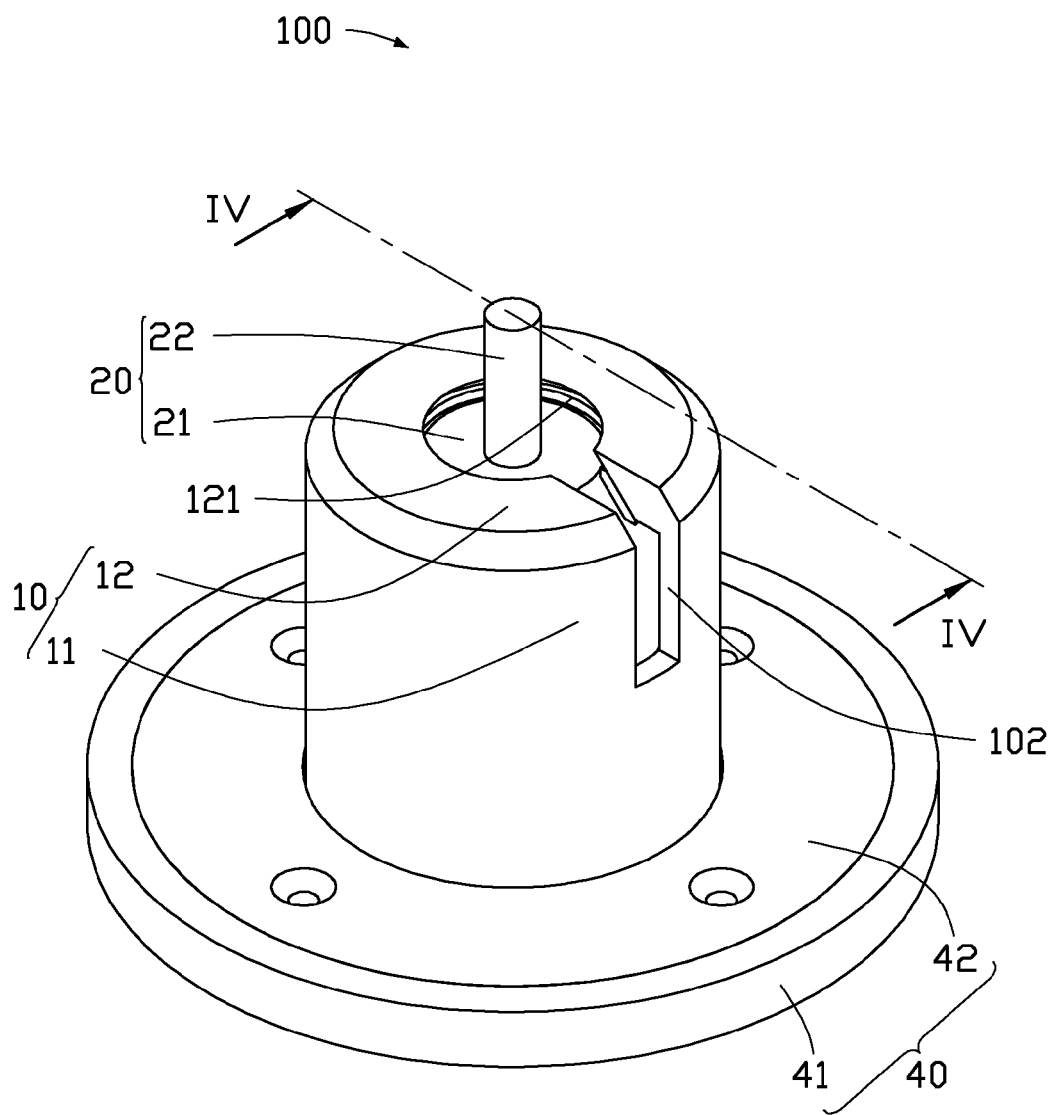
FIG. 3 is an assembled view of the tripod head of FIG. 1.
Figure 4:
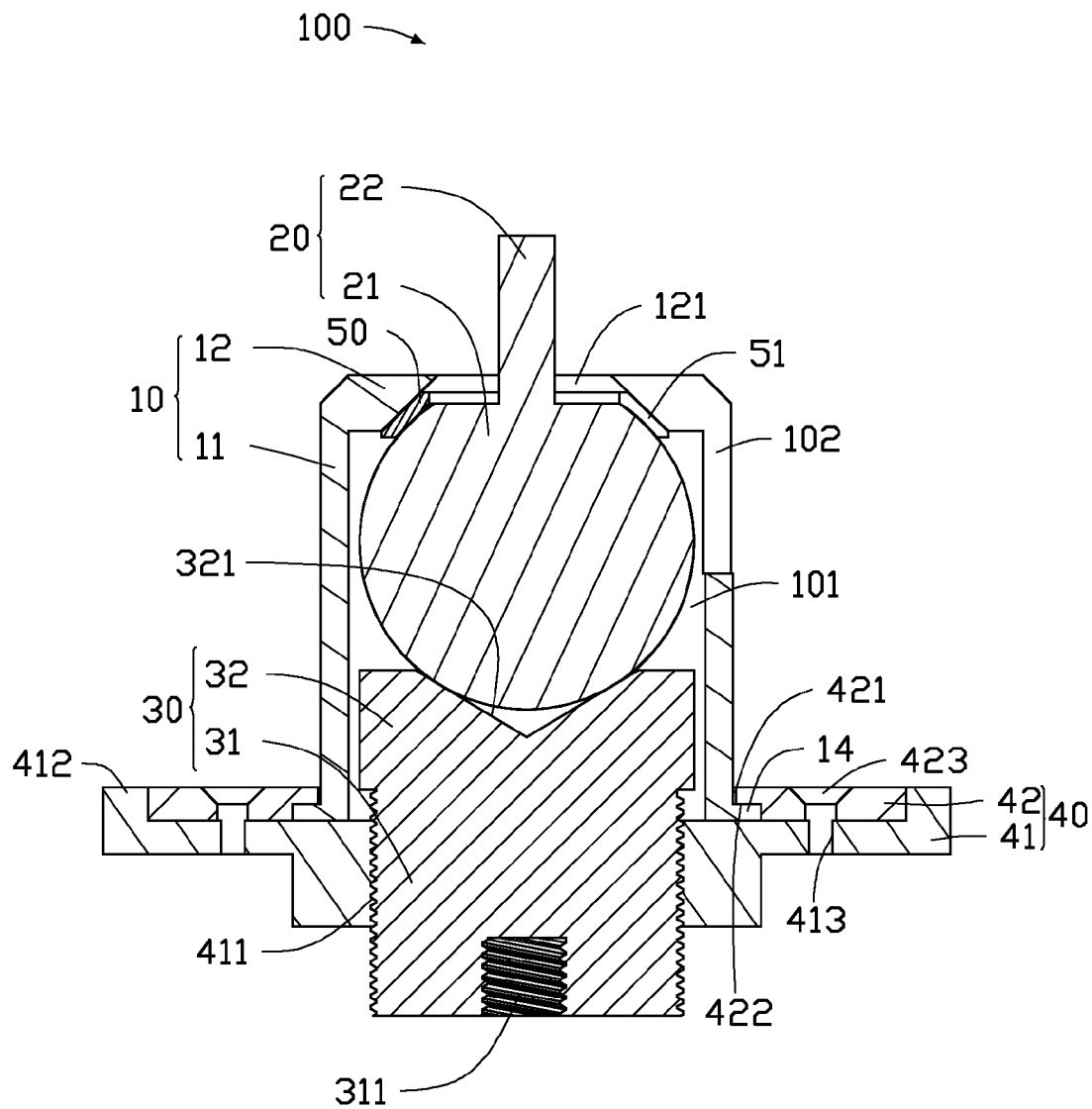
FIG. 4 is a cross-sectional view of the tripod head of FIG. 3, taken along line IV-IV.

Referring to FIGS. 3-4, in assembly, the adjusting member 20 is received in the receiving space 101, the connecting portion 22 passes out of the shell 10 through the first adjusting opening 121 or the second adjusting opening 102, and the pad 50 is positioned between the adjusting portion 21 and an inner surface of the shell 10. The opening 51 is aligned with the second adjusting opening 102. An end of the shell 10 with the upper plate 12 passes through the through hole 421 so that the flange portion 14 abuts against the recess portion 422. The threaded portion 31 of the supporting member 30 screws into the threaded hole 411. The first plate 41 and the second plate 42 are fixed to each other so that the flange portion 14 is sandwiched between them. The supporting portion 32 inserts into the receiving space 101 of the shell 10, and the supporting surface 321 supports the adjusting portion 21. The locking member 40 is rotatably connected to the supporting member 30, such that when the locking member 40 is rotated relative to the supporting member 30, the locking member 40 locks or unlocks the adjusting portion 21 in the receiving space 101. In this embodiment, when the locking member 40 is rotated along a clockwise direction, the locking member 40 moves toward the supporting portion 32; when the locking member 40 is rotated along a counterclockwise direction, the locking member 40 moves away from the supporting portion 32.

In use, the tripod head 100 is fixed on the tripod (not shown), and a camera (not shown) is fixedly connected to the connecting portion 22 of the adjusting member 20. Before shooting, the adjusting portion 21 is unlocked in the receiving space 101, and a position and shooting angle of the camera is adjusted. The position and shooting angle of the camera is adjusted by moving the connecting portion 22 in the first adjusting opening 121 and/or the second adjusting opening 102. The second adjusting opening 102 allows the camera to be adjusted vertically or horizontally.

When a satisfied position and shooting angle is adjusted, the locking member 40 is rotated to lock the adjusting member 20 between the supporting member 30 and the upper plate 12. The pad 50 provides a frictional force on the adjusting member 20 when the adjusting member 20 is locked to ensure a steady support for the camera.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the disclosure.

What is claimed is:

1. A tripod head, comprising:
   a shell, the shell defining a receiving space and a first adjusting opening communicating with the receiving space, the shell comprising a sidewall and an upper plate connected to the sidewall, the sidewall and the upper plate cooperatively defining the receiving space therebetween, and the first adjusting opening defined in the upper plate;
   an adjusting member comprising a spherical-shaped adjusting portion and a connecting portion connected to the adjusting portion, the adjusting portion being received in the receiving space, the connecting portion passing out of the shell through the first adjusting opening, the adjusting portion adjusting a position and angle of the connecting portion relative to the shell by rotating in the receiving space relative to the shell;
   a supporting member supporting the adjusting portion in the receiving space, the supporting member comprising a threaded portion and a supporting portion connected to the threaded portion, the supporting portion inserting into the receiving space and supporting the adjusting portion in the receiving space, and the threaded portion screwed into the locking member; and
   a locking member configured for locking the adjusting portion between the supporting member and the shell, the locking member comprising a first plate and a second plate connected to the first plate, and an end of the shell away from the upper plate fixedly restricted between the first plate and the second plate.

2. The tripod head of claim 1, wherein the shell defines a second adjusting opening communicating with the first adjusting opening, the second adjusting opening extends from the first opening into the sidewall.

3. The tripod head of claim 2, wherein the second adjusting opening in the sidewall extends along a direction perpendicularly away from the upper plate.

4. The tripod head of claim 2, wherein the second adjusting opening in the sidewall helically extends away from the upper plate.

5. The tripod head of claim 2, wherein the tripod head comprises a pad positioned between the adjusting portion and an inner surface of the shell.

6. The tripod head of claim 5, wherein the pad defines an opening spatially corresponding to the second adjusting opening.

7. The tripod head of claim 5, wherein an outer side surface of the pad is substantially truncated conical-shaped.

8. The tripod head of claim 1, wherein the supporting portion comprises a supporting surface facing away from the threaded portion, the supporting surface is a concave surface, and a shape of the supporting surface is accommodated with an outer surface of the adjusting portion.

9. The tripod head of claim 1, wherein the first plate defines a threaded hole in a central portion thereof, the threaded hole accommodates the threaded portion of the supporting member, and the threaded portion screws into the threaded hole.

10. The tripod head of claim 9, wherein a thickness of the central portion of the first plate is larger a thickness of a peripheral portion of the first plate surrounding the central portion.

11. The tripod head of claim 10, wherein the first plate comprises a protrusion portion at the peripheral portion, and a shape of the second plate is accommodated with an inner side surface of the protrusion portion.

12. The tripod head of claim 1, wherein the sidewall comprises a flange portion on an end away from the upper plate, the flange portion radically protrudes from the sidewall, the second plate defines a through hole and a recess portion surrounding the through hole, the flange portion is received in the recess portion and directly sandwiched between the first and second plates, and the sidewall passes through the through hole of the second plate.

13. A tripod head comprising:
   a shell comprising a sidewall and an upper plate connected to the sidewall, the sidewall and the upper plate cooperatively defining a receiving space therebetween, the upper plate defining a first adjusting opening communicating with the receiving space;
   an adjusting member comprising a spherical-shaped adjusting portion and a connecting portion connected to the adjusting portion, the adjusting portion being received in the receiving space, the connecting portion passing out of the shell through the first adjusting opening, the adjusting portion adjusting a position and angle of the connecting portion relative to the shell by rotating in the receiving space relative to the shell;
   a supporting member supporting the adjusting portion in the receiving space; and
   a locking member configured for locking the adjusting portion between the supporting member and the shell, the locking member comprising a first plate and a second plate connected to the first plate, and an end of the shell away from the upper plate fixedly restricted between the first plate and the second plate.

14. The tripod head of claim 13, wherein the shell defines a second adjusting opening communicating with the first adjusting opening, the second adjusting opening extends from the first opening into the sidewall.

15. The tripod head of claim 14, wherein the second adjusting opening in the sidewall extends along a direction perpendicularly away from the upper plate.

16. The tripod head of claim 14, wherein the second adjusting opening in the sidewall helically extends away from the upper plate.

17. The tripod head of claim 14, wherein the tripod head comprises a pad positioned between the adjusting portion and an inner surface of the shell.

18. The tripod head of claim 17, wherein the pad defines an opening spatially corresponding to the second adjusting opening.

19. The tripod head of claim 17, wherein an outer side surface of the pad is substantially truncated conical-shaped.

20. The tripod head of claim 13, wherein the supporting member comprises a threaded portion and a supporting portion connected to the threaded portion, the supporting portion inserts into the receiving space and supports the adjusting portion in the receiving space, and the threaded portion is screwed into the locking member.

\* \* \* \* \*